US009854646B2

United States Patent
Kreml

(10) Patent No.: US 9,854,646 B2
(45) Date of Patent: Dec. 26, 2017

(54) METHOD AND A DEVICE FOR THE REDUCTION OF MARGINS OF THE LIGHT IMAGE OF A HEADLIGHT AND THE HEADLIGHT

(71) Applicant: Varroc Lighting Systems, s.r.o., Senov u Noveho Jicina (CZ)

(72) Inventor: Tomas Kreml, Ostrava-Poruba (CZ)

(73) Assignee: VARROC LIGHTING SYSTEMS, S.R.O. (CZ)

( * ) Notice: Subject to any disclaimer, the term of this patent is extended or adjusted under 35 U.S.C. 154(b) by 126 days.

(21) Appl. No.: 15/084,265

(22) Filed: Mar. 29, 2016

(65) Prior Publication Data

US 2016/0288696 A1    Oct. 6, 2016

(30) Foreign Application Priority Data

Mar. 30, 2015   (CZ) ............................... PV 2015-224

(51) Int. Cl.
*F21V 7/00*       (2006.01)
*H05B 37/02*      (2006.01)
(Continued)

(52) U.S. Cl.
CPC ...... *H05B 37/0227* (2013.01); *F21S 48/1131* (2013.01); *F21S 48/1159* (2013.01);
(Continued)

(58) Field of Classification Search
CPC .............. H05B 37/0227; F21S 48/1258; F21S 48/1159; G01M 11/064; G01M 11/0242
See application file for complete search history.

(56) References Cited

U.S. PATENT DOCUMENTS

2012/0039083 A1    2/2012   Meyrenaud
2012/0063156 A1*   3/2012   Yasuda ................ F21S 48/1159
                                                        362/516
(Continued)

FOREIGN PATENT DOCUMENTS

DE    102012206391    10/2013
EP       1433655 A2    6/2004
(Continued)

OTHER PUBLICATIONS

Search Report from Corresponding Czech Application No. PV2015-224 dated Nov. 2, 2015 (3 pages).

*Primary Examiner* — Evan Dzierzynski
(74) *Attorney, Agent, or Firm* — Hovey Williams LLP; Joan Optican Herman

(57) ABSTRACT

A method and a device for the reduction of margins of the light image of a headline, and the headline incorporating the device, is provided, having a reflective diaphragm which is adapted to be shifted in a light axis direction within adjustment limits of a longitudinal position. The margins of the light image can be detected by an optical colour-sensitive photometric sensor, and colour characteristics of the light image margins can be evaluated by identifying a current position of the reflective diaphragm. The reflective diaphragm can then be fixed in the longitudinal position corresponding to selected colour characteristics of the light image margins. The reflective diaphragm can also be adapted to be shifted in a direction perpendicular to the light axis direction.

7 Claims, 5 Drawing Sheets

(51) Int. Cl.
  *F21S 8/10* (2006.01)
  *H05B 33/08* (2006.01)
  *G01M 11/02* (2006.01)
  *G01M 11/06* (2006.01)
  *F21Y 101/00* (2016.01)

(52) U.S. Cl.
  CPC ....... *F21S 48/1258* (2013.01); *F21S 48/1388* (2013.01); *F21S 48/142* (2013.01); *F21S 48/145* (2013.01); *F21S 48/1757* (2013.01); *G01M 11/0242* (2013.01); *G01M 11/064* (2013.01); *H05B 33/0851* (2013.01); *H05B 33/0872* (2013.01); *F21S 48/328* (2013.01); *F21Y 2101/00* (2013.01)

(56) References Cited

U.S. PATENT DOCUMENTS

2014/0112012 A1* 4/2014 Nakazato ............. F21S 48/1159
                                                    362/510
2017/0015236 A1* 1/2017 Masuda ................ B60Q 1/1423

FOREIGN PATENT DOCUMENTS

| JP | 2009199752 A | 9/2009 |
| KR | 20110030194 A | 3/2011 |

* cited by examiner

US 9,854,646 B2

METHOD AND A DEVICE FOR THE REDUCTION OF MARGINS OF THE LIGHT IMAGE OF A HEADLIGHT AND THE HEADLIGHT

FIELD OF THE INVENTION

The invention relates to a method of reducing the margins of the headlight light image produced from rays of the light source by reflection from the inner convex surface of the reflector, passing over the trim edge of a reflective diaphragm and exiting through the headlight lens onto the display surface.

The invention further relates to a device for reduction of the margins of the light image of a headlight, comprising a headlight with at least one light source, a reflector with a bowl-shaped inner surface for reflection of rays of the light source, with a reflective diaphragm with a trim edge for trimming of light rays and with an output lens for exit of light rays from the headlight to produce a light image on the display surface.

Finally, the invention relates to a headlight, comprising at least one light source, a reflector with a bowl-shaped inner surface for reflection of rays of the light source, a reflective diaphragm with a trim edge for trimming of light rays and an output lens for exit of light rays from the headlight to produce a light image on the display surface.

BACKGROUND INFORMATION

What happens with headlights of the said types, especially headlights of motor vehicles, is that the margins of the light image produced by the headlight on the display surface are wide and blurred. Different light refraction passing through the top and bottom part of the lens influences the colour characteristics of the light/darkness transition and the transitional line of the light and darkness boundary is wide with blurred margins. To reduce the width and enhance the sharpness of the margins, a lens with very low dispersion can be used, which is however very costly and the effect cannot be controlled very well.

The document DE102012206391 discloses a light device, comprising a light source, a bowl-shaped reflector, an output lens and a diaphragm arranged in the area of the bowl-shaped reflector, whose reflective surface faces the bowl-shaped reflector and has a local vault on the reflective surface. The local vault of the reflective surface of the diaphragm has a longitudinal shape running transversally over the reflective surface. The light device reduces the width of the coloured margin of the produced light image. The bowl-shaped reflector and the reflective diaphragm are at least partly arranged in the same section of the light axis. The light source may be a light diode. The vault of the reflective surface of the diaphragm influences the light beam passing through the top half of the lens, and it can be adjusted in such a way that a significant reduction of the coloured margin of the light image is achieved. The angle and place of incidence of rays onto the lens can be adjusted in a targeted way to optimize the direction of the rays and the colour characteristics of the margins of the light image. The optimization of the colour characteristics of the margins of the light image and the nearly white colour is achieved by selection of the vault of the reflective surface of the diaphragm in such a way that non-white strips of the colour spectrum are mixed and combined, and coloured places are moved towards white places. The efficiency of the light device depends on the accuracy of production of the vault on the reflective surface of the diaphragm, on the accuracy of seating of the diaphragm in the reflector, as well as accurate mounting of the lens in the reflector. Possible production and assembly inaccuracies cannot be remedied after the assembly of the reflector. Precise production of the vault in a part of the reflective surface of the diaphragm is more expensive and demanding for the accuracy of the other parts of the optical system.

The goal of the invention is to eliminate the shortcomings of the prior art and to provide a method and device for reduction of the margins of the light image of a headlight and a headlight that will produce, on the display surface, a light image with a narrower margin and higher sharpness of the transition between the lit and dark part of the display surface. Another goal of the invention is to improve the peak luminous intensity of the high beam in a headlight with two LED light sources.

PRINCIPLE OF THE INVENTION

The shortcomings of the prior art are substantially eliminated and the goal of the present invention is achieved by a method of reducing the margins of the light image of a headlight produced by rays of the light source by reflection from the inner bowl-shaped surface of a reflector, passing over the trim edge of a reflective diaphragm and exiting through a headlight lens onto the display surface. In accordance with one embodiment of the present invention, the reflective diaphragm can be moved in the light axis direction within the adjustment limits of the longitudinal position, the margins of the light image are detected with an optical colour-sensitive photometric sensor and the colour of the margins of the light image is evaluated with a link to the current position of the reflective diaphragm, wherein the reflective diaphragm is fixed in the longitudinal position corresponding to the selected colour of the light image margin.

The reflective diaphragm is preferably fixed in the longitudinal position corresponding to the purple colour of the light image margin. The reflective diaphragm with a broken trim edge in a headlight with two LED light sources arranged over each other is preferably shifted in the direction perpendicular to the light axis, to adjust the transversal position of the boundary break to the horizontal position corresponding to the peak luminous intensity of the light beam of the bottom light source for the high beam.

The reduction method of the margins of the light image of the headlight can be implemented with the use of a device for reduction of the margins of the light image of the headlight, the device comprising at least one light source, a reflector with a bowl-shaped inner surface for reflection of the light source rays, a reflective diaphragm with a trim edge for trimming of the light rays, and an output lens for the exit of the light rays from the headlight and production of the light image on the display surface. According to the invention, the method and device also comprises an optical colour-sensitive photometric instrument for detection of the colour characteristics of the margins of the light image on the display surface, a handling device for adjustment of the position of the reflective diaphragm mounted in the light axis direction (x) in a sliding way within the adjustment limits of the longitudinal position and fitted with a fixing means for fixing the longitudinal position corresponding to the selected colour of the light image margin, and a control unit for evaluation of the colour of the light image margins on the display surface with a link to the current position of the reflective diaphragm and for the control of the handling device.

The device further preferably contains a means for adjusting the position of the reflective diaphragm mounted in a sliding way in the horizontal direction (h-h) perpendicular to the light axis (x) within the transversal adjustment limits, for horizontal adjustment of the transversal position of the boundary break in the light image corresponding to the peak luminous intensity of the light beam of the bottom LED light source (1a) for the high beam.

The reduction method of margins of the light image of the headlight can be manifested in a headlight, especially for motor vehicles, comprising at least one light source, a reflector with a bowl-shaped inner surface for reflection of the rays of the light surface, a reflective diaphragm with a trim edge for trimming of the light rays, and an output lens (11) for the exit of light rays from the headlight and creation of the light image on the display surface, in which according to the invention the reflective diaphragm is mounted in a sliding way in the light axis (x) direction within the adjustment limits of the longitudinal position and fitted with a fixing means of the longitudinal position corresponding to the selected colour of the light image margin.

The reflective diaphragm with a broken trim edge of a headlight with two reflectors and LED light sources arranged over each other, is preferably mounted in a sliding way in the horizontal direction (h-h) perpendicular to the light axis (x) within the transversal adjustment limits for the horizontal adjustment of the transversal position of the boundary break in the light image, and fitted with a fixing means for fixation of the transversal position corresponding to the peak luminous intensity of the light beam of the bottom LED light source (1a) for the high beam.

According to one embodiment of the invention, the white light emitted by the light source is projected on a vertical display surface where the coloured light image produced by passing of the light along the trim edge of the diaphragm and subsequent refraction during the passage through the lens is visible. When the reflective diaphragm is moved in the light axis direction, depending on the distance between the lens and diaphragm, the colour image of the light and darkness boundary on the display surface changes, wherein the red light is diffracted most and purple light least. Approximation of the diaphragm towards the lens adds yellow, and retraction of the diaphragm away from the lens adds blue to the colour spectrum. The colour of the boundary on the display surface is optically evaluated, and depending on the displayed colour, the diaphragm is moved in the longitudinal direction to the position where the boundary colour on the display surface is lost and the boundary will be mostly displayed as black and white. Experience shows that when the diaphragm is located in the focal point, the colour of the boundary is slightly purplish. In case of a low gradient the boundary is blurred, the colour is lost and there is only a light-darkness boundary. In the achieved target position, the longitudinal position of the diaphragm with regard to the headlight is fixed.

The reduction method of the margins of the light image according to one embodiment of the invention improves accuracy of the longitudinal adjustment of the position of the trim edge of the reflective diaphragm in the focal point of the lens. An advantage of the reduction method of the margins of the light image produced by the headlight according to the invention is high and repeatable accuracy of adjustment of the reflective diaphragm, which substantially reduces coloured margins of the light image. An advantage of the headlight according to the invention is the achievement of a significant reduction of the coloured margin of the light image produced by the headlight. Another advantage is a simple design.

According to one embodiment of the invention, in reflectors with two LED light sources the position of the reflective diaphragm is also adjusted in the transversal direction. First, the bottom LED is lit and the peak of the high light beam emitted by the reflector is determined. Then, the bottom LED is switched off and the top LED is lit. Transversal movement of the diaphragm is used to set the boundary break to the same horizontal position as the position of the peak of the high light beam emitted by the reflector. In a reflector with two LED light sources the optimum transversal setting of the position of the trim edge of the reflective diaphragm is advantageously achieved and the transversal inaccuracy of mounting of the LED sources, is compensated. The reduction method of margins of the light image in a reflector with two LED light sources is especially advantageous when used in a two-part reflector.

OVERVIEW OF FIGURES IN THE DRAWINGS

The method and device for reduction of the margins of the light image of a headlight and the headlight according to the invention are clarified with the use of drawings, where FIG. 1 shows a diagram of the device for reduction of the margins of the light image of a headlight;

EXAMPLES OF AN EMBODIMENT OF THE INVENTION

Figure 1:
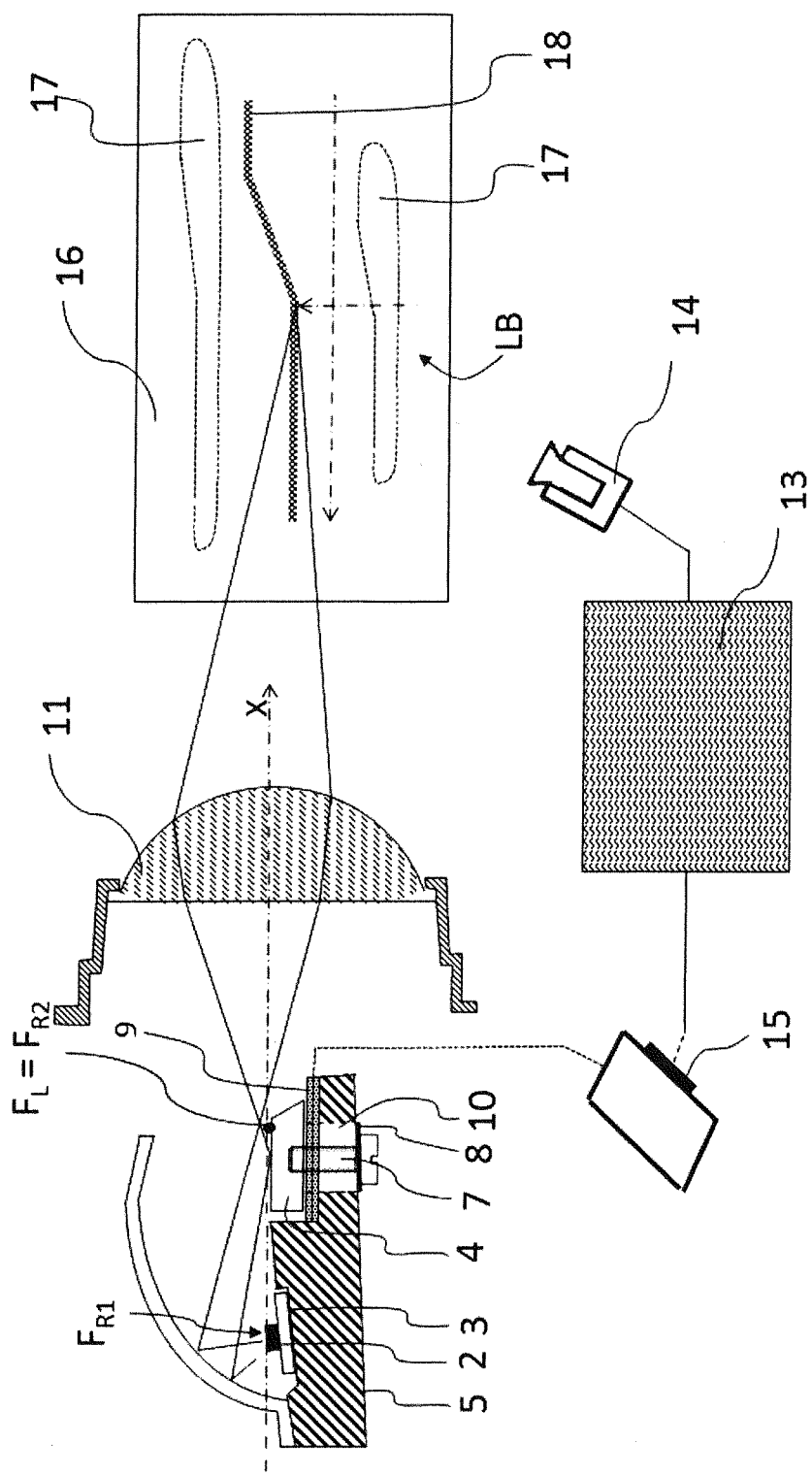

According to FIG. 1, a planar LED light source 2 is mounted in a light source holder 3 that is connected in a heat-conductive way to a thermal pad 5, the purpose of which is to dissipate heat emitted by the light source 2. In another part of the thermal pad 5 a longitudinal guiding groove 10 is provided, through which a fixing screw 7 passes that is fitted with a washer 8 at one side and that is connected to the reflective diaphragm 4 with its free end thread at the other side. Between the reflective diaphragm 4 and the body of the thermal pad 5 a guiding element 9 is mounted, having a hole that the fixing screw 7 passes through. Movement of the guiding element 9 in the longitudinal axis x direction is used to adjust the longitudinal position of the reflective diaphragm 4. The fixing screw 7 passes through the longitudinal groove 10 with a play for adjustment of the longitudinal position in the direction of the light axis x. By turning of the fixing screw 7 the reflective diaphragm 4 is fixed to the thermal pad 5. The guiding element 9, mounted in a sliding way on the body of the thermal pad 5, is connected to a handling device 15 with a mechanical link. Moving the guiding element 9 in the direction of the light axis x causes movement of the reflective diaphragm 4 in the light axis x direction.

The light rays emitted by the planar LED light source 2 get reflected from a reflector with a bowl-shaped inner surface, which is not shown here, to the light axis x direction. After the reflection from the reflector, a part of the light rays is further reflected from the reflective surface of the reflective diaphragm 4, being directed to the top half of the optical lens 11, and a part passes without being reflected from the reflective diaphragm 4 directly to the bottom part of the optical lens 11. The boundary between the rays reflected from the reflective diaphragm 4 and the rays passing without being reflected from the reflective diaphragm 4 is determined by the trim edge of the reflective diaphragm 4. Having passed through the optical lens 11, both the parts of the light rays converge on the display surface 16, where they produce light images 17 of the low light beam LB. The low beam LB is delimited by the edge 18 of the light image in the perpendicular direction.

The light source 2 lies in the first focal point $F_{R1}$ of the non-displayed reflector, whose second image focal point $F_{R2}$ lies near the focal point $F_L$ of the lens 11. To detect the colour characteristics of the margin 18 of the light image, the device comprises an optical colour-sensitive photometric instrument 14 that converts the detected colour image measured on the display surface 16 into signals and forwards these signals to the control unit 13. Having evaluated the signals, the control unit 13 sends commands to the handling device 15, which, using well-known control means, controls and moves the guiding element 9 in the direction of the light axis X.

Figure 2:
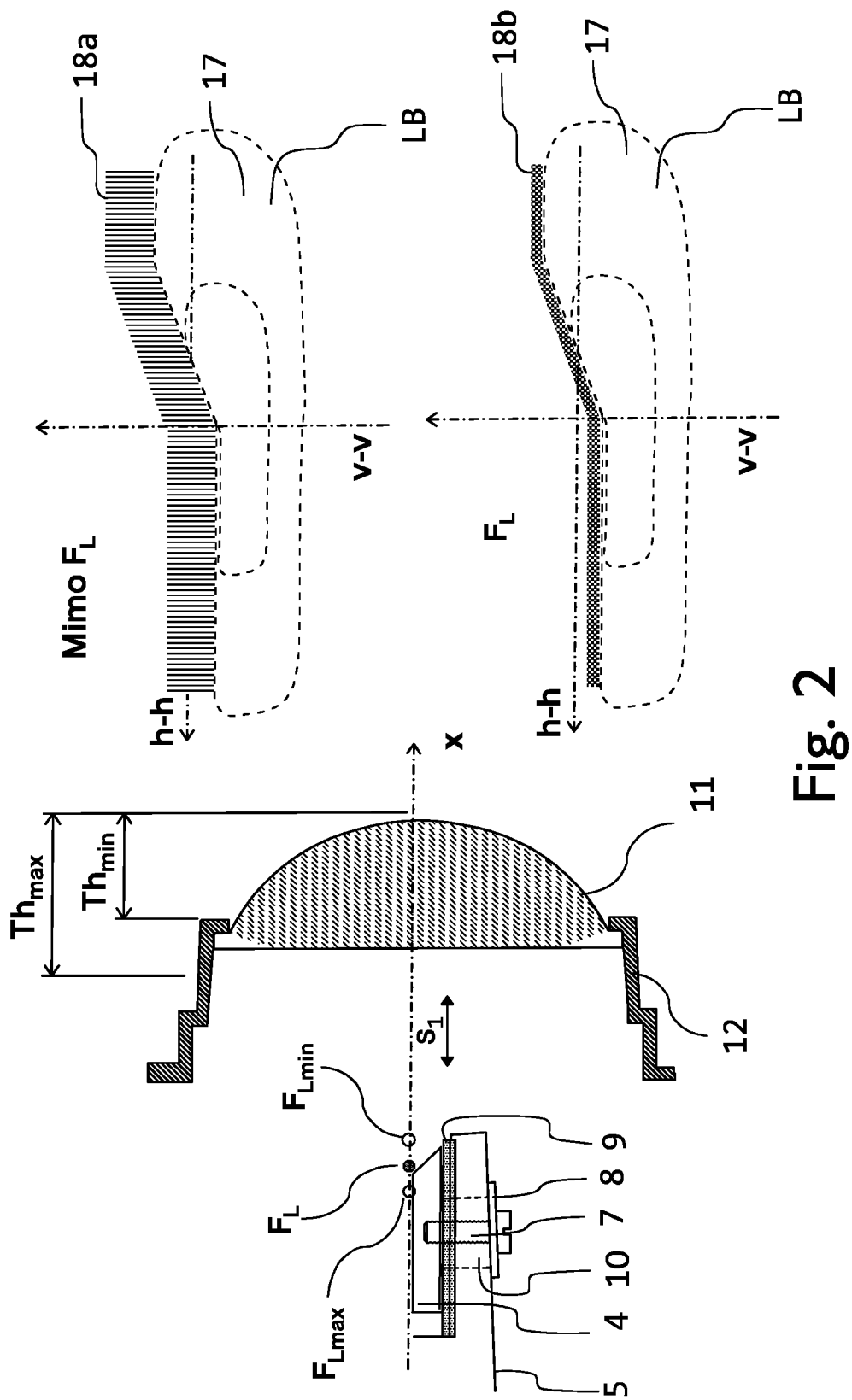
FIG. 2 represents a vertical longitudinal cross-section of a headlight with a longitudinally adjustable reflective diaphragm.

FIG. 2 shows the reflective diaphragm 4, which is mounted on the guiding element 9 and can be moved together with the guiding element 9 in the longitudinal direction Si of the light axis X. The guiding element 9 is mounted in a sliding way on the thermal pad 5. The thermal pad 5 is fitted with a longitudinal groove 10. The fixing screw 7 of the reflective diaphragm 4 passes through the longitudinal groove 10 of the thermal pad. The longitudinal groove 10 enables longitudinal movement of the fixing screw 7 in the direction of the light axis X. Between the head of the fixing screw 7 and the thermal pad 5, there is a washer 8. The free end of the fixing screw 7 passes through the guiding element 9 and reaches into a thread created in the reflective diaphragm 4. In the selected position, the position of the reflective diaphragm 4 can be fixed by tightening of the fixing screw 7, which presses the washer 8 to the thermal pad 5. In the direction of the light axis X, a converging lens 11 is installed that is mounted in a holder 12. The thickness of the converging lens varies due to the production tolerance between the maximum value $Th_{max}$ and the minimum value $Th_{min}$. Different positions of the focal point $F_L$ of the converging lens 11 on the light axis X, which lie between the end positions $F_{Lmax}$ and $F_{Lmin}$, correspond to different thickness values of the converging lens 11. The right part of FIG. 2 shows the margins 18a, 18b of the light image 17 produced by the light rays on the display surface 16.

The top right part of FIG. 2 shows a wide margin 18a created if the focal point $F_L$ of the converging lens 11 lies outside the trim edge of the reflective diaphragm 4. The margin 18a is wide with blurred transitional lines and markedly colourful with representation of many colours of the colour spectrum produced by dispersion of light rays, diffracting at the trim edge of the reflective diaphragm if the focal point $F_L$ of the converging lens 11 lies outside the trim edge of the reflective diaphragm 4. The bottom right part of FIG. 2 shows a reduced narrow margin 18b produced if the focal point $F_L$ of the converging lens 11 lies in the place of the trim edge of the reflective diaphragm 4. If the focal point $F_L$ of the converging lens 11 lies just close to or directly in the place of the trim edge of the reflective diaphragm 4, the margin of the light image 17 on the display surface is the narrowest and its edges are the sharpest. The colour of the narrow margin 18b of the light image 17 is purple. Movement of the reflective diaphragm 4 in the light axis x direction as shown in the left part of FIG. 2 can be used to set the longitudinal position of the trim edge of the reflective diaphragm 4 in such a way to place it to the focal point $F_L$ of the lens 11 to achieve the narrowest margin 18b of the light image 17.

Figure 3:
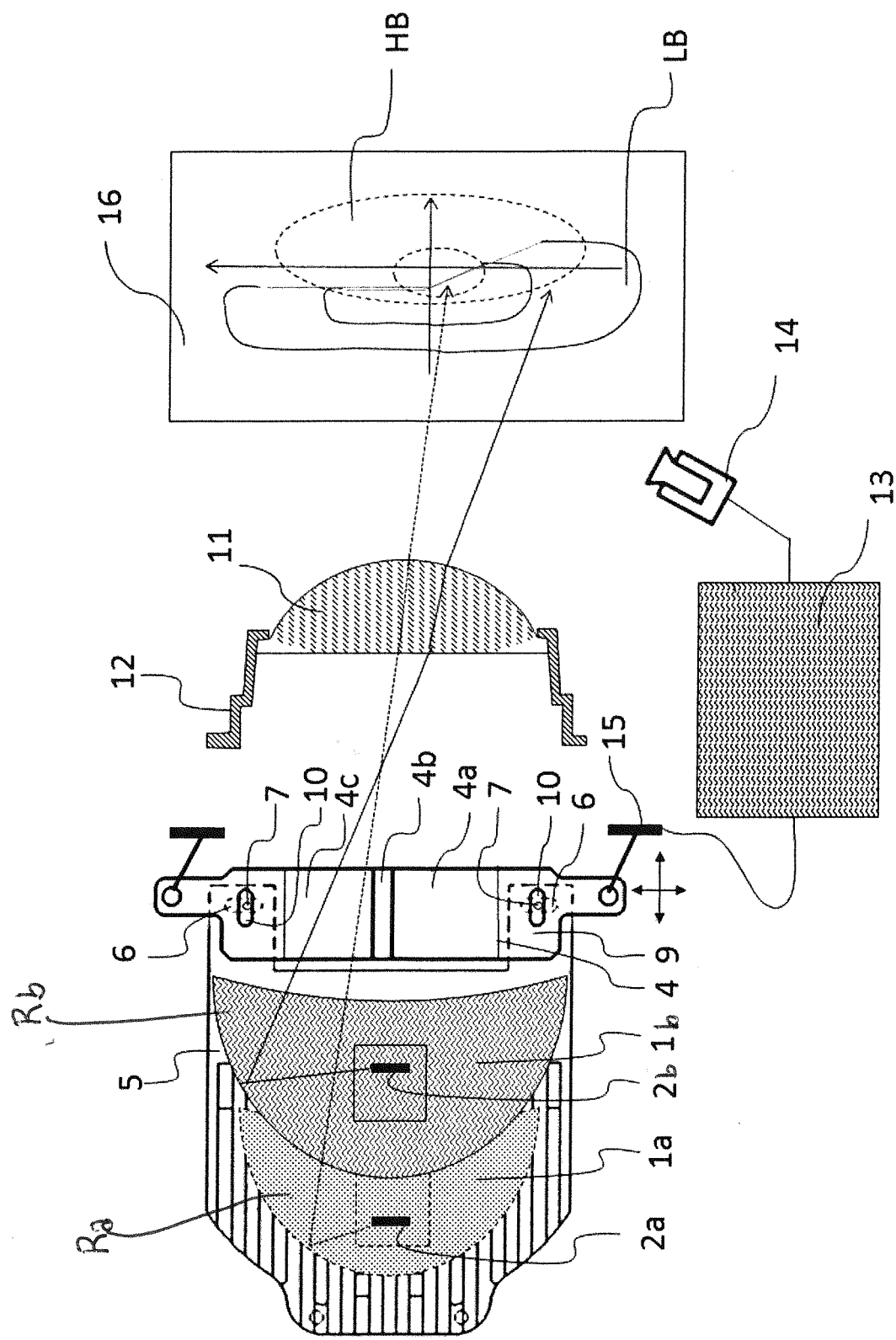
FIG. 3 shows a diagram of a top view of the device for transversal adjustment of the reflective diaphragm.

In FIG. 3, the diagram of the device for transversal adjustment of the reflective diaphragm shows a horizontal longitudinal cross-section through parts of a headlight with a two-part reflector, where a bottom flat LED light source 2a with a bottom reflector 1a and a top flat LED light source 2b with a top reflector 1b are indicated. In the flow direction of the light rays from the reflectors 1a, 1b, a converging lens 11 is arranged that is mounted in a holder 12. The bottom reflector 1a reflects the light ray Ra to the converging lens 11 and the top reflector 1b reflects the light ray Rb to the converging lens 11. The light rays Ra create the central area of the high light beam HB, the light rays Rb create the marginal area of the high light beam HB. Between the reflectors 1a, 1b and the converging lens 11 there is a reflective diaphragm 4 consisting of the first marginal part 4a, transitional part 4b and the second marginal part 4c. The reflective diaphragm 4 is mounted on the guiding element 9, which is mounted on a thermal pad 5 both in a sliding way in the longitudinal direction of the light axis x and in a sliding way in the transversal direction, perpendicularly to the direction of the light axis X.

Similarly to FIG. 1 and FIG. 2, it is the fixing screw 7 that is used to guide the reflective diaphragm 4, being screwed with its free end into the reflective diaphragm 4 and passing in a fitting manner through the hole in the guiding element 9. For the longitudinal movement of the guiding element 9, a longitudinal groove 10 is provided in the guiding element 9; for transversal movement of the guiding element 9, a transversal groove 6 is provided in the thermal pad 5. For movement in the longitudinal direction of the light axis x and for movement perpendicularly to the light axis, the guiding element 9 is connected with a mechanical link to the handling device 15. The luminous intensity of the high beam HB on the display wall is detected by an optical photometric instrument 14, which forwards the obtained signals to the control unit 13. In the control unit 13, the signals of the optical photometric instrument 14 are converted to commands for the handling device 15 which is also connected to the control unit 13.

Figure 4:
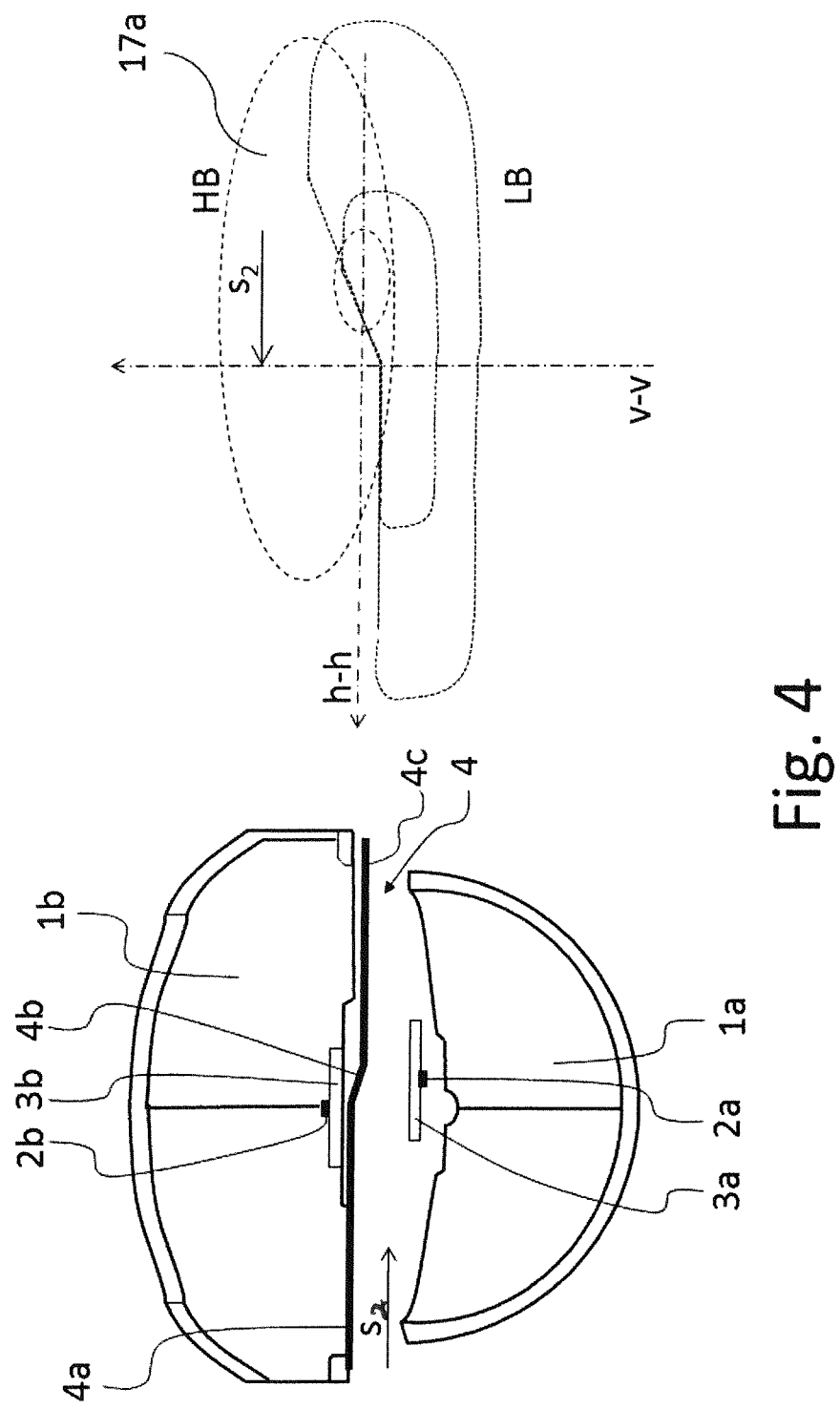
FIG. 4 represents an axial view of a two-part reflector with a reflective diaphragm before the adjustment.
Figure 5:
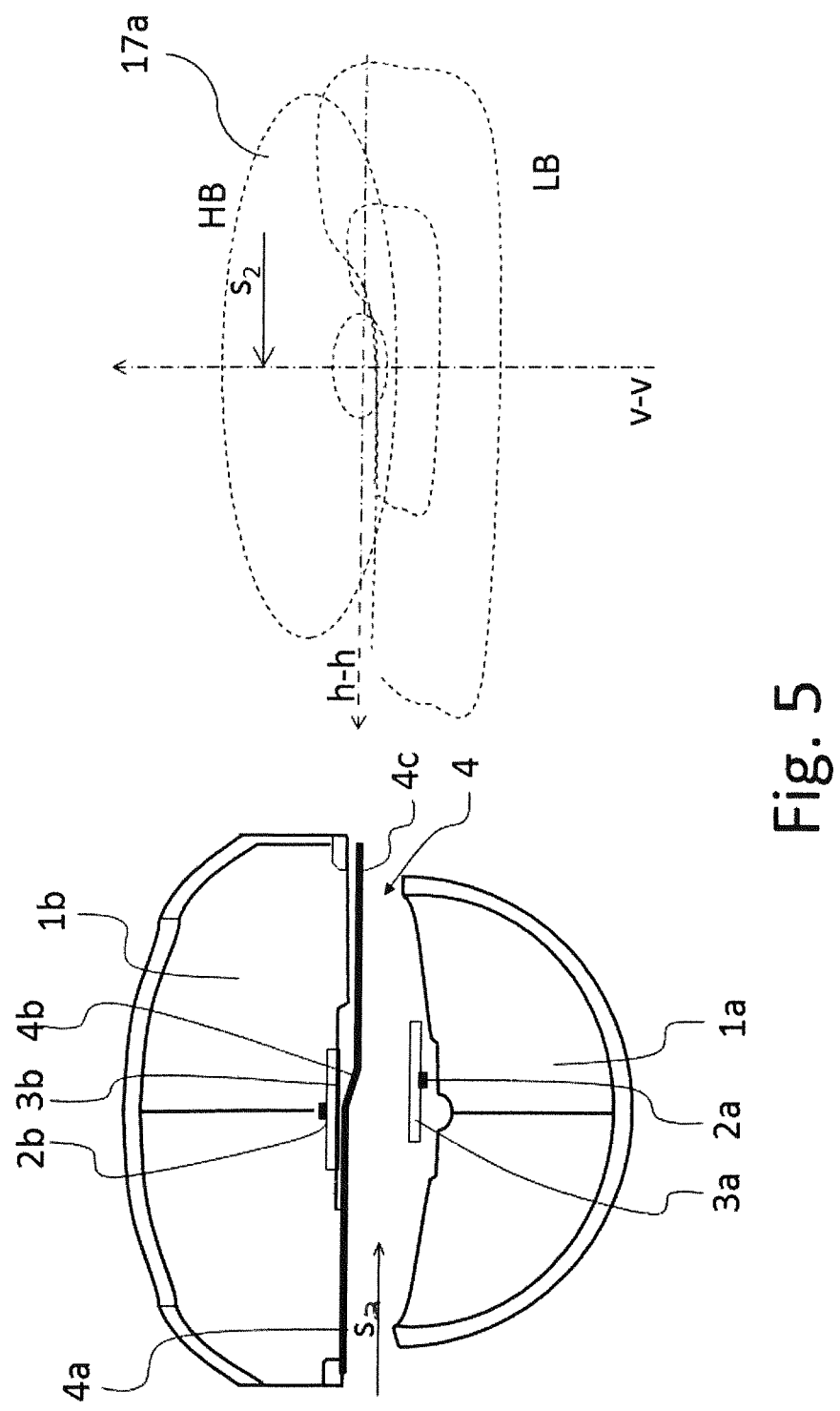
FIG. 5 represents an axial view of a two-part reflector with a reflective diaphragm after the adjustment.

In FIG. 4 and FIG. 5, the left parts of FIG. 4 and FIG. 5 show the bottom reflector 1a, the bottom flat LED light source holder 3a with a LED light source 2a, further the top reflector 1b, the top flat LED light source holder 3b with a LED light source 2b and, arranged between them, the reflective diaphragm 4 with the first marginal part 4a, transitional part 4b and the second marginal part 4c. The movement direction $S_2$ in the perpendicular direction to the light axis x for transversal position setting is schematically indicated here. The right parts of FIG. 4 and FIG. 5 show the low light beam LB and the high light beam HB.

According to FIG. 4, the high light beam is shifted along the horizontal line h-h to the right with respect to the vertical axis v-v due to the production tolerance. The shift direction $S_2$ is indicated that is used to increase the luminous intensity of the high light beam HB emitted by the bottom flat LED light source 1a.

According to FIG. 5, the high light beam HB is shifted along the horizontal line h-h in the direction $S_2$ with respect to the vertical axis v-v, which gives it the peak luminous intensity. In FIG. 5, by shifting in the direction $S_2$, the light beam HB is shifted with respect to the vertical axis v-v, which increases the luminous intensity of the high light beam HB emitted by the bottom flat LED light source 2a and its luminous intensity is at the peak level. Transversal movement of the diaphragm 4 is used to adjust the boundary break to the same horizontal position as the position of the peak of the high light beam emitted by the reflector, which ensures the optimum transversal adjustment of the position of the trim edge of the reflective diaphragm 4 and compensates for any transversal inaccuracy of mounting of the LED sources. For compensation of the transversal inaccuracy of mounting of the LED sources, the device for reduction of the margins of the light image according to the present invention is advantageously used.

LIST OF REFERENCE SIGNS

1a Bottom reflector
1b Top reflector
2 LED light source
2a Bottom light source
2b Top light source
3 Light source holder
3a Bottom light source holder
3b Top light source holder
4 Reflective diaphragm
4a First margin of diaphragm
4b Transitional part of diaphragm
4c Second margin of diaphragm
5 Thermal pad
6 Transversal groove
7 Fixing screw
8 Washer
9 Guiding element
10 Longitudinal groove
11 Lens
12 Lens holder
13 Control unit
14 Optical photometric instrument
15 Handling device
16 Display surface
17 Light image
18 Margin
18a Wide margin
18b Narrow margin
$F_L$ Focal point of the lens
$F_R$ Focal point of the reflector
$T_h$ Lens thickness
x Optical axis
$S_1$ Longitudinal shift direction
$S_2$ Transversal shift direction
h-h Horizontal line
v-v Vertical line
HB High beam
LB Low beam
Ra Light ray from bottom reflector
Rb Light ray from top reflector

What is claimed is:

1. A method of reducing margins of a light image of a headlight created from rays of a light source by reflection from an inner bowl-shaped surface of a reflector, by passing over trim edges of a reflective diaphragm, and by exiting through a headlight lens onto a display surface, wherein the reflective diaphragm is shifted in a light axis direction within adjustment limits of a longitudinal position, the margins of the light image are detected by an optical colour-sensitive photometric sensor, and colour characteristics of the margins of the light image are evaluated with a link to a current position of the reflective diaphragm, and wherein the reflective diaphragm is fixed in the longitudinal position corresponding to selected colour characteristics of the margin of the light image.

2. The method of reducing the light image margins according to claim 1, wherein the reflective diaphragm is fixed in the longitudinal position corresponding to a purple colour of the light image margin.

3. The method of reducing the light image margins according to claim 1, wherein the reflective diaphragm has a broken trim edge and is in a headlight with two LED light sources arranged over each other, and is shifted in a perpendicular direction to the light axis, to set a transversal position of a boundary break to a horizontal position corresponding to a peak luminous intensity of the light beam of a bottom light source for a high light beam.

4. A device for reducing margins of a light image of a headlight comprising at least one light source (2), a reflector having a bowl-shaped inner surface for reflection of rays of the light source (2), a reflective diaphragm (4) having a trim edge for trimming of light rays, and an output lens (11) with optical axis (x) for the exit of the light rays from the headlight to create the light image (17) on a display surface (16), wherein the device comprises an optical colour-sensitive photometric instrument (14) for detecting colour characteristics of the margins (18) of the light image (17) on the display surface (16), a handling device (15) for setting a position of the reflective diaphragm (4) mounted, in a direction of the optical axis (x), in a sliding way within adjustment limits of a longitudinal position, the reflective diaphragm (4) being provided with a fixing means to fix the longitudinal position corresponding to selected colour characteristics of the margin of the light image (17), and a control unit (13) for evaluation of colour characteristics of the margins (18) of the light image (17) on the display surface (16) with a link to a current position of the reflective diaphragm (4) and for control of the handling device (15).

5. The device for reducing the margins of the light image of a headlight according to claim 4, wherein the device further comprises a means for adjustment of the position of the reflective diaphragm (4) mounted in a sliding way in a horizontal direction (h-h), perpendicular to the optical axis (x), within transversal adjustment limits, for horizontal setting of a transversal position of a boundary break in the light image, corresponding to a peak luminous intensity of the light beam of a bottom LED light source (1a) for a high beam.

6. A headlight, especially a headlight for motor vehicles, comprising at least one light source (2), a reflector having a bowl-shaped inner surface for reflection of rays of the light source (2), a reflective diaphragm (4) with a trim edge for trimming of light rays, and an output lens (11) with optical axis (x) for the exit of the light rays from the headlight and for creation of a light image (17) on a display surface (16), wherein the reflective diaphragm (4) is mounted in a sliding way in the direction of the optical axis (x) within adjustment limits of a longitudinal position, and is provided with a fixing means for fixing the longitudinal position corresponding to selected colour characteristics of margins (18) of the light image (17), wherein the headlight is adapted for connection of an optical colour-sensitive photometric instrument (14) for detecting colour characteristics of the margins (18) of the light image (17) on the display surface (16), of a handling device (15) for setting the longitudinal position of the reflective diaphragm (4), and of a control unit (13) for evaluation of colour characteristics of the margins (18) of the light image (17) on the display surface (16) and with a link to a current position of the reflective diaphragm (4), and for control of the handling device (15).

7. The headlight according to claim 6, wherein the reflective diaphragm (4) has a broken trim edge and is in the headlight with two reflectors (1*a*, 1*b*) and two LED light sources (2*a*, 2*b*) arranged over each other, and is mounted in a sliding way also in a horizontal direction (h-h) perpendicular to the optical axis (x) within transversal adjustment limits for a horizontal adjustment of a transversal position of a boundary break in the light image (17), and is provided with a fixing means for fixing of the transversal position corresponding to a peak luminous intensity of the light beam of a bottom LED light source (1*a*) for a high light beam.

* * * * *